US011977806B2

(12) United States Patent
Rathi et al.

(10) Patent No.: US 11,977,806 B2
(45) Date of Patent: May 7, 2024

(54) PRESENTING CONTENT ON SEPARATE DISPLAY DEVICES IN VEHICLE INSTRUMENT PANEL

(71) Applicant: Atieva, Inc., Newark, CA (US)

(72) Inventors: Saurabh Vinodkumar Rathi, Sunnyvale, CA (US); Gina Park, Pasadena, CA (US); Karina Nicole Cosgro, Watsonville, CA (US); Yunwei Yang, Union City, CA (US); Eugene Joseph Lee, Oakland, CA (US); Raymond Leonard Bessemer, Fremont, CA (US); Derek N. Jenkins, Malibu, CA (US); Akshay Rajkumar Hasija, Fremont, CA (US); James Lee, Hayward, CA (US); Hwan Chul Kang, Dublin, CA (US); Soumya Thandra, San Jose, CA (US); Paul Hsu, Fremont, CA (US); Nicholas James Hope, Oakland, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/059,086

(22) Filed: Nov. 28, 2022

(65) Prior Publication Data

US 2023/0092408 A1    Mar. 23, 2023

Related U.S. Application Data

(63) Continuation of application No. 16/948,199, filed on Sep. 8, 2020, now Pat. No. 11,513,754.

(51) Int. Cl.
 *G06F 3/14* (2006.01)
 *B60K 35/00* (2006.01)
 (Continued)

(52) U.S. Cl.
 CPC ............ *G06F 3/1423* (2013.01); *B60K 35/00* (2013.01); *G06F 3/0481* (2013.01);
 (Continued)

(58) Field of Classification Search
 CPC .. G06F 3/1423; G06F 3/0481; G06F 3/04845; G06F 3/04883; G06F 3/167;
 (Continued)

(56) References Cited

U.S. PATENT DOCUMENTS 9,405,444 B2    8/2016   Reeves
9,602,576 B2    3/2017   Kruglick
(Continued)

FOREIGN PATENT DOCUMENTS

CA          2806906 A1      8/2013
DE    102013000068 A1      7/2014
(Continued)

OTHER PUBLICATIONS

Steve Scott Tompkins et al., ("Swipe Based Navigation" Published Nov. 5, 2014—total 8 pages (Year: 2014).*
(Continued)

*Primary Examiner* — Quoc A Tran
(74) *Attorney, Agent, or Firm* — Brake Hughes Bellermann LLP

(57) ABSTRACT

Presenting first drawer area on a first display device in an instrument panel of a vehicle, the first drawer area presented in an extended state; presenting second drawer area on a second display device in the instrument panel of the vehicle, the second drawer area presented in a retracted state; receiving first transition command regarding the first and second drawer areas; and in response to receiving the first transition command: presenting the first drawer area in the retracted state on the first display device, wherein the first content is not visible in the first drawer area in the retracted state; and
(Continued)

presenting the second drawer area in the extended state on the second display device, wherein the first content of the first application is visible in the second drawer area.

8 Claims, 11 Drawing Sheets

(51) Int. Cl.
*B60K 37/06* (2006.01)
*G06F 3/0481* (2022.01)
*G06F 3/04845* (2022.01)
*G06F 3/04883* (2022.01)
*G06F 3/16* (2006.01)

(52) U.S. Cl.
CPC ...... *G06F 3/04845* (2013.01); *G06F 3/04883* (2013.01); *G06F 3/167* (2013.01); *B60K 37/06* (2013.01); *B60K 2370/11* (2019.05); *B60K 2370/143* (2019.05); *B60K 2370/146* (2019.05); *B60K 2370/148* (2019.05); *B60K 2370/152* (2019.05); *B60K 2370/182* (2019.05); *B60K 2370/52* (2019.05); *G06F 2203/04803* (2013.01)

(58) Field of Classification Search
CPC .......... G06F 2203/04803; B60K 35/00; B60K 2370/11; B60K 2370/143; B60K 2370/146; B60K 2370/148; B60K 2370/152; B60K 2370/182; B60K 2370/52; B60K 37/06
See application file for complete search history.

(56) References Cited

U.S. PATENT DOCUMENTS

| | | |
|---|---|---|
| 10,108,331 B2 | 10/2018 | Li |
| 2011/0115737 A1 | 5/2011 | Fuyuno et al. |
| 2012/0188185 A1 | 7/2012 | Cassar |
| 2013/0293364 A1 | 11/2013 | Ricci et al. |
| 2014/0012497 A1 | 1/2014 | Pierfelice |
| 2014/0096051 A1 | 4/2014 | Boblett et al. |
| 2014/0096069 A1 | 4/2014 | Boblett et al. |
| 2014/0280580 A1 | 9/2014 | Langlois et al. |
| 2015/0099495 A1 | 4/2015 | Crosbie et al. |
| 2015/0138448 A1 | 5/2015 | Rawlinson et al. |
| 2015/0346836 A1 | 12/2015 | Schlittenbauer et al. |
| 2016/0101697 A1 | 4/2016 | Rawlinson et al. |
| 2016/0257264 A1 | 9/2016 | Rawlinson |
| 2018/0081614 A1 | 3/2018 | Tsai et al. |
| 2018/0321843 A1 | 11/2018 | Giannotti et al. |
| 2019/0042066 A1 | 2/2019 | Kim et al. |
| 2019/0070959 A1 | 3/2019 | Hamasaki et al. |
| 2019/0155559 A1 | 5/2019 | Huang et al. |
| 2020/0210131 A1* | 7/2020 | Gomes Chang ...... G06F 3/0482 |
| 2020/0218487 A1 | 7/2020 | Rush et al. |
| 2020/0309556 A1 | 10/2020 | Tsay et al. |
| 2020/0371733 A1* | 11/2020 | Rao ........................ G06F 3/0481 |
| 2021/0072943 A1 | 3/2021 | Enokida et al. |
| 2021/0165537 A1* | 6/2021 | Sirpal .................. G06F 1/1632 |
| 2021/0240783 A1 | 8/2021 | Ricci |

FOREIGN PATENT DOCUMENTS

| | | |
|---|---|---|
| DE | 112016004768 T5 | 7/2018 |
| EP | 2544072 A2 | 1/2013 |
| EP | 2750915 A2 | 7/2014 |
| WO | 2015094891 A1 | 6/2015 |

OTHER PUBLICATIONS

International Search Report and Written Opinion for PCT Application No. PCT/US2021/071388, dated Dec. 23, 2021, 13 pages.

* cited by examiner

PRESENTING CONTENT ON SEPARATE DISPLAY DEVICES IN VEHICLE INSTRUMENT PANEL

CROSS-REFERENCE TO RELATED APPLICATION

This application is a continuation of, and claims priority to, U.S. patent application Ser. No. 16/948,199, filed on Sep. 8, 2020, entitled "PRESENTING CONTENT ON SEPARATE DISPLAY DEVICES IN VEHICLE INSTRUMENT PANEL," the disclosure of which is incorporated by reference herein in its entirety.

TECHNICAL FIELD

This document relates to presenting content on separate display devices in a vehicle instrument panel.

BACKGROUND

Modern vehicles are becoming increasingly sophisticated, including in the amount of computer-based interactions they offer for the driver or passengers, and the complexity of such interactions and the powerful resources being provided to the user. Some previous efforts have provided a graphical user interface on one or more screens in a vehicle. However, such attempts have applied a monolithic perspective to the content or functions that are made available, and have not provided the user (e.g., the driver) with a technological framework that allows easy, high-level access to a variety of functions (e.g., for use while driving) and also provides the necessary tools for detailed and complex tasks (e.g., for use while parked).

SUMMARY

In a first aspect, a computer-implemented method comprises: presenting a first drawer area on a first display device in an instrument panel of a vehicle, the first drawer area presented in an extended state where first content of a first application is visible in the first drawer area; presenting a second drawer area on a second display device in the instrument panel of the vehicle, the second drawer area presented in a retracted state where the first content of the first application is not visible in the second drawer area; receiving a first transition command regarding the first and second drawer areas; and in response to receiving the first transition command: presenting the first drawer area in the retracted state on the first display device instead of in the extended state, wherein the first content is not visible in the first drawer area in the retracted state; and presenting the second drawer area in the extended state on the second display device, wherein the first content of the first application is visible in the second drawer area, and wherein additional content of the first application that was not visible in the first drawer area is also visible in the second drawer area.

Implementations can include any or all of the following features. The first display device is horizontally aligned with an instrument cluster in the vehicle, and wherein the second display device is positioned vertically below the first display device. Receiving the first transition command comprises at least one of: detecting a tap on the first drawer area; detecting a tap on the second drawer area; detecting a swipe gesture on the first drawer area in a direction toward the second display device; or detecting a swipe gesture on the second drawer area in a direction away from the first display device. The retracted state on the second display device comprises that a header of the second drawer area, and not a body of the second drawer area, is presented on the second display device, wherein in the extended state on the second display device the header and the body of the second drawer area are presented on the second display device; and the retracted state on the first display device comprises that a header of the first drawer area, and not a body of the first drawer area, is presented on the first display device, wherein in the extended state on the first display device the header and the body of the first drawer area are presented on the first display device. In the retracted state on the second display device the header of the second drawer area is presented at a top edge of the second display device, and wherein in the retracted state on the first display device the header of the first drawer area is presented at a bottom edge of the first display device. Receiving the first transition command includes detecting a voice command. Also a second application is associated with the first and second drawer areas. Presenting the first drawer area comprises: determining which of the first and second applications is active on the first display device; and in response determining that the first application is active on the first display device, providing the first content of the first application for presentation in the first drawer area. The computer-implemented method further comprises: receiving, while the first drawer area is presented in the retracted state and the second drawer area is presented in the extended state, a command to deactivate the first application on the first display device and to activate the second application on the first display device; and in response to receiving the command: ceasing to present the first content and the additional content of the first application in the second drawer area; and presenting in the second drawer area, with the second drawer area remaining in the extended state, second content of the second application and additional content of the second application. The computer-implemented method further comprises: receiving a second transition command regarding the first and second drawer areas, the second transition command received while the second content and the additional content of the second application are presented in the second drawer area; and in response to receiving the second transition command: presenting the first drawer area in the extended state on the first display device, where the second content of the second application is visible in the first drawer area and the additional content of the second application is not visible in the first drawer area; and presenting the second drawer area in the retracted state on the second display device, where the second content and the additional content are not visible in the second drawer area. The computer-implemented method further comprises: receiving a second transition command regarding the first and second drawer areas, the second transition command received while the second content and the additional content of the second application are presented in the second drawer area; and in response to receiving the second transition command: presenting the first drawer area in the extended state on the first display device, where the first content of the first application is visible in the first drawer area and the additional content of the first application is not visible in the first drawer area; and presenting the second drawer area in the retracted state on the second display device, where the first content and the additional content are not visible in the second drawer area. Receiving the second transition command comprises at least one of: detecting a tap on the first drawer area; detecting a tap on the second drawer area; detecting a swipe gesture on the first drawer area in a direction away from the second display device; or detecting a swipe gesture on the second drawer area in a direction toward the first display device. Presenting the additional content comprises presenting an additional function of the first application. The additional function comprises a text entry field, wherein an on-screen keyboard is available on the second display device and the on-screen keyboard is not available on the first display device. The first application is a navigation application currently focusing on an establishment at a destination, and wherein the additional function comprises a reservation function relating to the establishment.

In a second aspect, a computer program product is tangibly embodied in a non-transitory storage medium, the computer program product including instructions that when executed cause a processor to perform operations, the operations comprising: presenting a first drawer area on a first display device in an instrument panel of a vehicle, the first drawer area presented in an extended state where first content of a first application is visible in the first drawer area; presenting a second drawer area on a second display device in the instrument panel of the vehicle, the second drawer area presented in a retracted state where the first content of the first application is not visible in the second drawer area; receiving a first transition command regarding the first and second drawer areas; and in response to receiving the first transition command: presenting the first drawer area in the retracted state on the first display device instead of in the extended state, wherein the first content is not visible in the first drawer area in the retracted state; and presenting the second drawer area in the extended state on the second display device, wherein the first content of the first application is visible in the second drawer area, and wherein additional content of the first application that was not visible in the first drawer area is also visible in the second drawer area.

In a third aspect, a computer program product is tangibly embodied in a non-transitory storage medium, the computer program product including instructions that when executed cause a processor to generate a graphical user interface, the graphical user interface comprising: a first state in which: a first drawer area is presented on a first display device in an instrument panel of a vehicle, the first drawer area presented in an extended state where first content of a first application is visible in the first drawer area; and a second drawer area is presented on a second display device in the instrument panel of the vehicle, the second drawer area presented in a retracted state where the first content of the first application is not visible in the second drawer area, the second display device positioned lower in the instrument panel than the first display device; a second state in which: the first drawer area is presented in the retracted state on the first display device instead of in the extended state, wherein the first content is not visible in the first drawer area in the retracted state; and the second drawer area is presented in the extended state on the second display device, wherein the first content of the first application is visible in the second drawer area, and wherein additional content of the first application that was not visible in the first drawer area is also visible in the second drawer area; and an input control configured for generating a first transition command, wherein the graphical user interface is configured to switch between the first and second states in response to the first transition command.

Implementations can include any of the following features. The first transition command corresponds to at least one of: a tap detected on the first drawer area; a tap detected on the second drawer area; a swipe gesture detected on the first drawer area in a direction toward the second display device; or a swipe gesture detected on the second drawer area in a direction away from the first display device. The retracted state on the second display device comprises that a header of the second drawer area, and not a body of the second drawer area, is presented on the second display device, wherein in the extended state on the second display device the header and the body of the second drawer area are presented on the second display device; and the retracted state on the first display device comprises that a header of the first drawer area, and not a body of the first drawer area, is presented on the first display device, wherein in the extended state on the first display device the header and the body of the first drawer area are presented on the first display device. In the retracted state on the second display device the header of the second drawer area is presented at a top edge of the second display device, and wherein in the retracted state on the first display device the header of the first drawer area is presented at a bottom edge of the first display device.

BRIEF DESCRIPTION OF DRAWINGS

Like reference symbols in the various drawings indicate like elements.

DETAILED DESCRIPTION

Figure 1A:
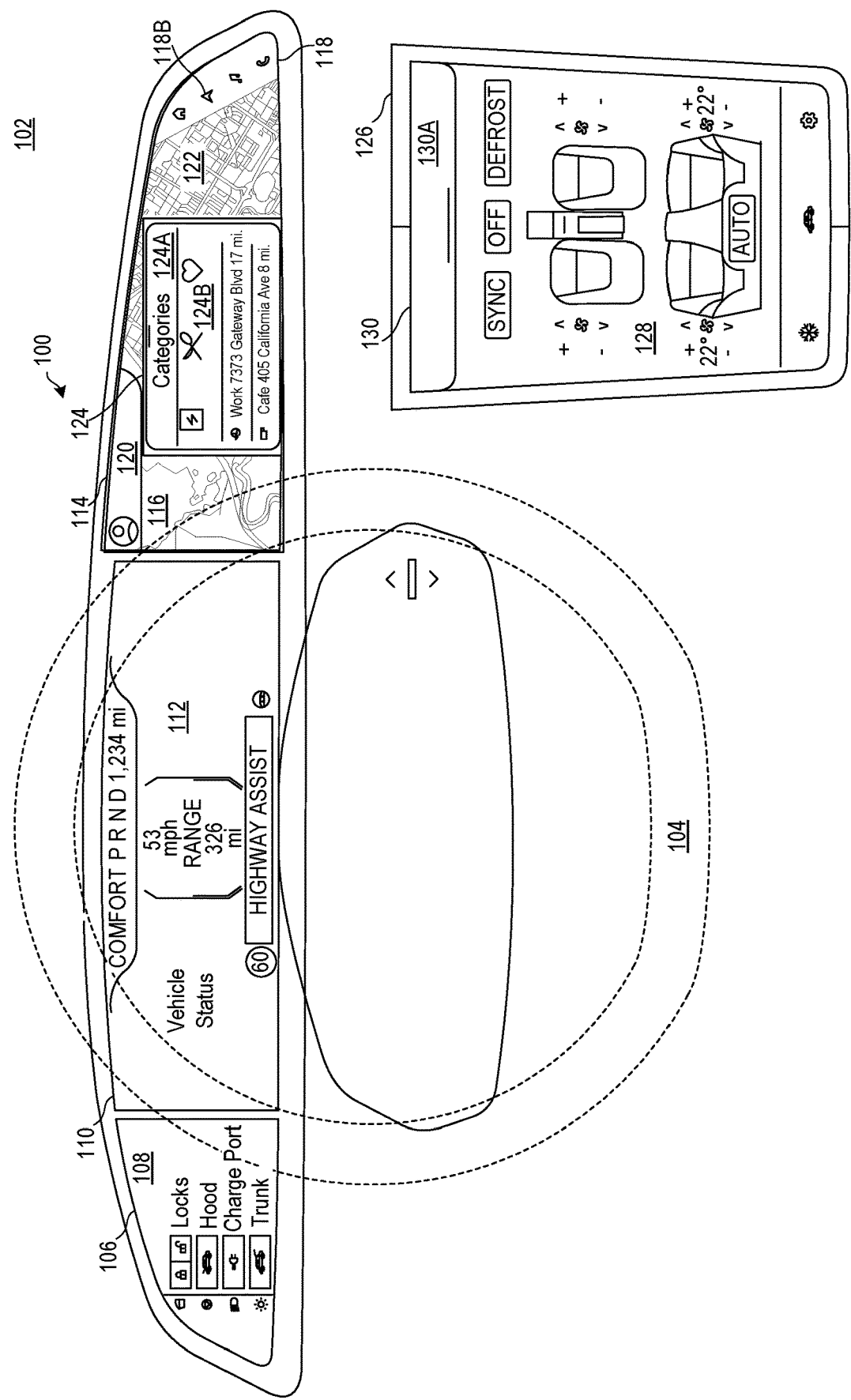
FIGS. 1A-1B show an example of an instrument panel of a vehicle.

This document describes examples of systems and techniques for providing flexible tools to a vehicle occupant (e.g., the driver) that allow easy, high-level access to certain functions, and to allow the vehicle occupant to perform more detailed or complex tasks relating to these functions on a device more suited for that kind of interaction. The tool(s) for tasks that are intended or suitable for interaction while driving can be provided approximately at an occupant eye level for use while driving, and the tool(s) for the richer, more detailed/complex operations can be provided elsewhere (e.g., at a center console). Moreover, the tools can be organized according to a paradigm that provides a flexible, intuitive, and continuous way of transitioning between two or more tasks. Such tasks can be directed toward consuming the content (e.g., viewing it and/or making basic inputs approximately at eye level), or actively interacting with the content at a deeper level (e.g., in a position more conducive to typing or making other screen inputs). Some implementations can provide a complex architecture of two or more display devices within the passenger compartment of a vehicle that seamlessly and transparently supports the vehicle occupant's transition between different types of tasks.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In some implementations, an instrument panel can be provided toward the front of the passenger compartment. For example, the instrument panel has a steering wheel or other steering device(s), and an instrument cluster including controls or indicators.

Examples herein refer to display devices. A display device visually outputs a graphical user interface for one or more computer devices. A display device can operate according to any of multiple display technologies used for presenting computer-based information. A display device can include a liquid crystal display (LCD), a light-emitting diode (LED) display, and/or a plasma display, to name just a few examples. A display device can be configured for receiving input for the computer device(s). In some implementations, a display device can feature one or more types of technology for detecting contact with, or proximity to, the screen by a user's hand or an implement such as a stylus. A display device can operate according to any of multiple touch-detecting, or gesture-recognizing, technologies. A display device can include a resistive touchscreen, a capacitive touchscreen, and/or a touchscreen based on optical imaging, to name just a few examples. A display device can have any of multiple shapes. In some implementations, a display device has a quadrilateral shape (e.g., rectangular), or a non-polygonal shape, to name just a few examples. A display device can have a substantially flat form factor (e.g., the screen is essentially planar), or a non-flat form factor (e.g., the screen is curved according to one or more radiuses.) Two or more display devices can be positioned according to any of multiple spatial relationships with regard to each other. One display device can be placed substantially above another display device in a vertical direction. One display device can be placed substantially to the side of another display device in a horizontal direction. One display device can be placed diagonally from another display device in any direction. Two or more display devices can be positioned so as to face in a common direction. Two or more display devices can be positioned so as to face in different directions from each other.

Examples herein refer to a drawer area being presented on one or more display devices. A drawer area is a portion of screen real estate that is dedicated for holding or containing output from one or more applications. A graphical user interface can be configured so that the drawer area can be presented in either of at least two states. An extended state can comprise that all (or mostly all) of the drawer area and its associated contents are visible on the display device. For example, the display device can then show both a header and a body of the drawer area. A retracted state can comprise that only some (or almost none) of the drawer area is visible on the display device. For example, the display device can then show a header, but not a body, of the drawer area. The same drawer area can be associated with more than one display device. A drawer area can have different states on separate display devices at the same time. For example, the drawer area can have an extended state on one display device simultaneously with having a retracted state on another display device.

Examples herein refer to one or more transitions of a drawer area. A transition can involve changing the drawer area from one state to another state. For example, the drawer area can be transitioned from an extended state to a retracted state, or vice versa. A user can trigger the computer device to perform the transition by making one or more kinds of input corresponding to a transition command. In some implementations, a tap on a display device can be recognized. For example, the user can tap on a retracted drawer area to transition the drawer area into an extended state. As another example, the user can tap on an extended drawer area to transition the drawer area into a retracted state. In some implementations, a swipe gesture can be recognized on a display device. For example, the user can swipe on a retracted drawer area, in a direction of extending the drawer area, to transition the drawer area into an extended state. As another example, the user can swipe on an extended drawer area, in a direction of retracting the drawer area, to transition the drawer area into a retracted state. In some implementations, one or more voice control commands can be recognized by a computer device and trigger a transition of a drawer area. For example, a computing device 700 in FIG. 7 can recognize voice commands using a microphone 732. In some implementations, pressing one or more buttons or keys can trigger a transition of a drawer area. For example, the computing device 700 can detect one or more buttons/keys being pressed on a keyboard 728.

Figure 1B:
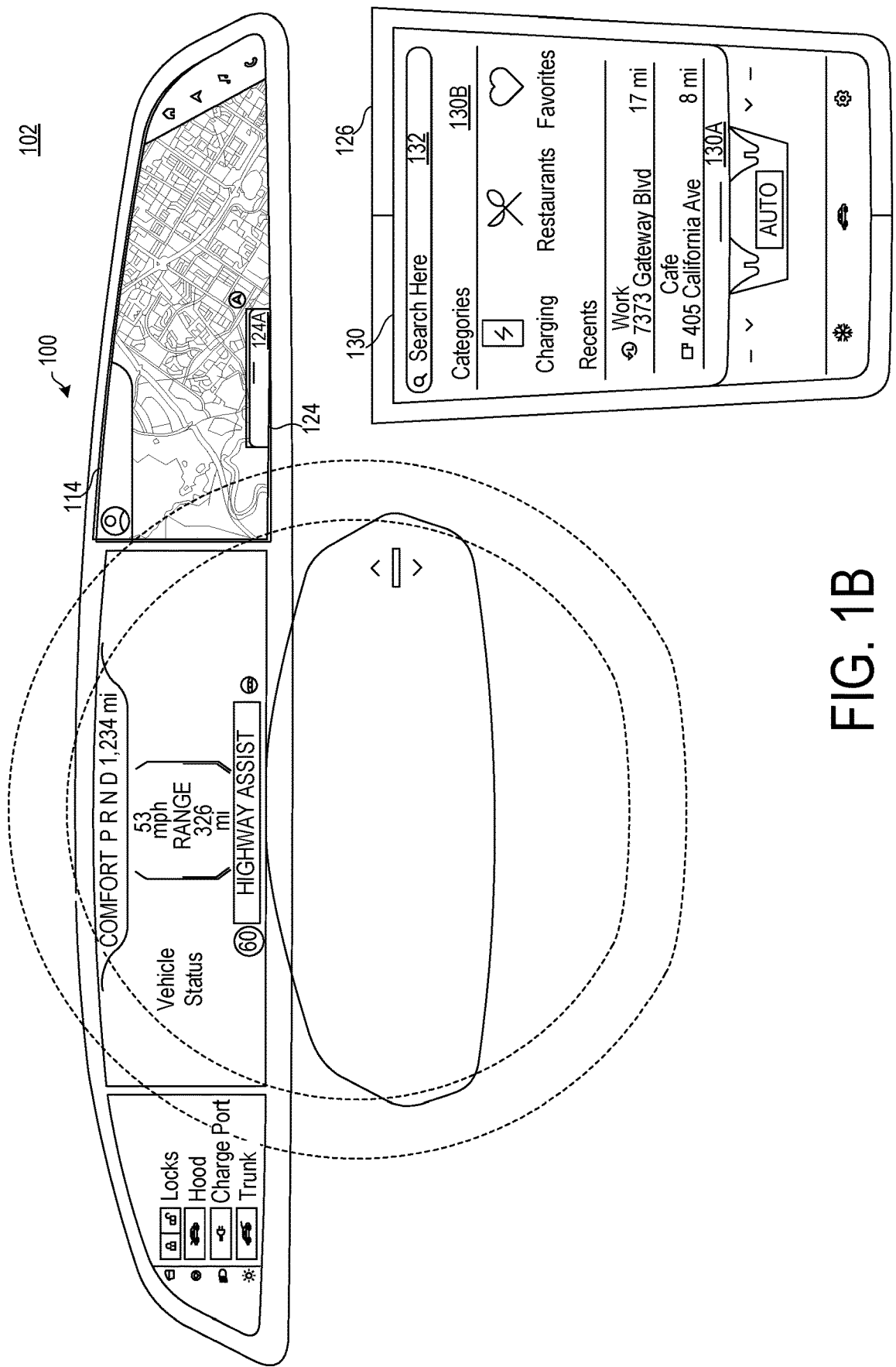

FIGS. 1A-1B show an example of an instrument panel 100 of a vehicle 102. The vehicle 102 is mostly omitted in the present illustrations for simplicity. The vehicle 102 includes a steering wheel 104 (here shown in phantom for clarity), that can be used in connection with, or independently of, one or more controls or functions available at the instrument panel 100. In some implementations, the steering wheel 104 can include one or more buttons, scroll wheels, or other controls by which the driver can make at least one input. For example, the driver can trigger a transition. The instrument panel 100 can be used in combination with one or more other examples described elsewhere herein.

The instrument panel 100 includes a display device 106 here positioned somewhat to the left of the steering wheel 104. In some implementations, the display device 106 provides content 108 corresponding to controls and/or output for one or more functions that should be visible at all times. For example, the display device 106 can relate to one or more of door closure sensors; headlights; door locks; a hood closure sensor; a charge port closure sensor; or a trunk closure sensor.

The instrument panel 100 includes a display device 110 here positioned essentially behind the steering wheel 104. In some implementations, the display device 110 provides content 112 corresponding to controls and/or output for one or more functions that form a digital cluster for the vehicle 102. For example, the display device 110 can relate to one or more of a vehicle status; a vehicle suspension operating mode; gear selection; odometry; speed; vehicle range (based on remaining electric charge or fuel amount); road speed limit; or driver assistance system status.

The instrument panel 100 includes a display device 114 here positioned somewhat to the right of the steering wheel 104. The display device 114 can be horizontally aligned with an instrument cluster in the vehicle 102. For example, the instrument cluster can include at least the display device 110. In some implementations, the display device 114 provides content 116 corresponding to controls and/or output for one or more applications. For example, the display device 114 can relate to infotainment applications. The display device 114 can include a persistent sidebar 118. In some implementations, the persistent sidebar 118 includes controls for activating a home screen, a navigation application, a media application, or a phone application. The display device 114 can include a persistent status bar 120. The persistent status bar 120 can provide visual non-interactive indicators. For example, the persistent status bar 120 can indicate a current driver profile, a current time, and/or a connectivity status.

In FIG. 1A, a control 118B for the navigation application has been activated, and the navigation application is providing output that is presented as the content 116. The content 116 includes a map 122 and a drawer area 124, both generated by the navigation application. The drawer area 124 is currently in an extended state. For example, a header 124A and a body 124B of the drawer area 124 are currently visible on the display device 114 when the drawer area 124 is in the extended state. The body 124B presently has content including a rubric "Categories," icons for respective charging, restaurants, and favorites, and a listing of recent destinations or points of interest. When the display device 114 is to be populated with the content 116, a determination can be made as to which of the applications is active, and the content of that application (e.g., here the map 122 and the contents of the drawer area 124) can be provided.

The instrument panel 100 includes a display device 126 here positioned lower than (e.g., essentially vertically below) the display device 114. The display device 126 is considered to be positioned in the instrument panel 100. For example, the display device 126 can be positioned lower in the same physical housing in which the display devices 106, 110, and 114 are mounted. As another example, the display device 126 can be mounted in a center console positioned between first-row seats in the vehicle 102, so as to be reachable by the driver (and optionally a first-row passenger). In some implementations, the display device 126 provides content 128 including controls and/or output for one or more core applications for the vehicle 102. For example, the content 128 can relate to heating, ventilation, and air conditioning (HVAC) functions or climate control; one or more vehicle functions; or system settings for the vehicle 102. In FIG. 1A, the content 128 on the display device 126 relates to HVAC/climate control.

The display device 126 can include a drawer area 130. The drawer area 130 is currently in a retracted state. For example, only a header 130A, and not a body, of the drawer area 130 is currently visible on the display device 126 when the drawer area 130 is in the retracted state. The header 130A is positioned at a top edge of the display device 126. The drawer area 130 can correspond to the drawer area 124. For example, when the drawer area 130 is in the retracted state, the drawer area 124 can be in the extended state, and vice versa.

The display devices 106, 110, 114, and 126 can be driven by one or more graphics processors (e.g., by one or more graphics boards). In some implementations, separate graphics processors are used for at least two of the display devices 106, 110, 114, and 126. For example, one graphics board can be used for the display devices 106 and 110, and another graphics board can be used for the display devices 114 and 126.

An occupant of the vehicle 102 can trigger one or more transitions by generating a transition command. For example, the user can do one or more of tapping on the drawer area 124 (e.g., in the header 124A thereof); performing a swipe gesture on the drawer area 124 (e.g., swiping in a direction toward the display device 126); tapping on the drawer area 130 (e.g., in the header 130A thereof); performing a swipe gesture on the drawer area 130 (e.g., swiping in a direction away from the display device 114); issuing a voice command; or pressing a button/key.

FIG. 1B shows an example of the instrument panel 100 after a transition has been performed. Elements from FIG. 1A that are not mentioned below may remain essentially the same (e.g., remain in a same state) as in the examples above.

The drawer area 124 on the display device 114 is currently in a retracted state. In some implementations, only the header 124A, and not the body 124B, of the drawer area 124 is presently visible on the display device 114. For example, the header 124A can be positioned at a bottom edge of the display device 114 when the drawer area 124 is in the retracted state.

The drawer area 130 on the display device 126 is currently in an extended state. In some implementations, the header 130A and a body 130B of the drawer area 130 are both presently visible on the display device 126. The body 130B can include some or all content that was in the drawer area 124 in FIG. 1A. For example, the body 130B presently includes content including the rubric "Categories," icons for respective charging, restaurants, and favorites, and a listing of recent destinations or points of interest, all of which were presented in the body 124B of the drawer area 124 in FIG. 1A. The body 130B can include additional content that was not visible in the drawer area 124 in FIG. 1A. For example, the body 130B can include an additional function of the currently active application (here, the navigation application). In some implementations, the additional function can include a text entry field 132. For example, an on-screen keyboard (e.g., the keyboard 728 in FIG. 7) may be available on the display device 126, whereas the on-screen keyboard may not be available on the display device 114.

The above examples illustrate that a computer-implemented method can include presenting a first drawer area (e.g., the drawer area 124) on a first display device (e.g., the display device 114) in an instrument panel (e.g., the instrument panel 100) of a vehicle (e.g., the vehicle 102). The first drawer area can be presented in an extended state (e.g., as shown in FIG. 1A) where first content (e.g., content in the body 124B) of a first application is visible in the first drawer area. The method can include presenting a second drawer area (e.g., the drawer area 130) on a second display device (e.g., the display device 126) in the instrument panel of the vehicle. The second drawer area can be presented in a retracted state (e.g., as shown in FIG. 1A) where the first content of the first application is not visible in the second drawer area. The method can include receiving a first transition command regarding the first and second drawer areas. In response to receiving the first transition command, the method can include presenting the first drawer area in the retracted state (e.g., as shown in FIG. 1B) on the first display device instead of in the extended state. The first content may not be visible in the first drawer area in the retracted state. In response to receiving the first transition command, the method can also include presenting the second drawer area in the extended state (e.g., as shown in FIG. 1B) on the second display device. The first content of the first application may be visible in the second drawer area. Additional content of the first application (e.g., the text entry field 132) that was not visible in the first drawer area may also be visible in the second drawer area. The second display device can be positioned lower (e.g., to facilitate on-screen typing) in the instrument panel than the first display device (e.g., which may be in the driver's line of sight).

One or more additional transitions can be performed. For example, this can be done when the user has finished performing a detailed or complex task using the display device 126, or if the user changes his or her mind about performing the task(s). In some implementations, the user can generate another transition command to trigger a transition back to essentially the state shown in FIG. 1A. For example, the drawer area 130 can then be brought into the retracted state, and the drawer area 124 can be brought into the extended state.

Figure 2A:
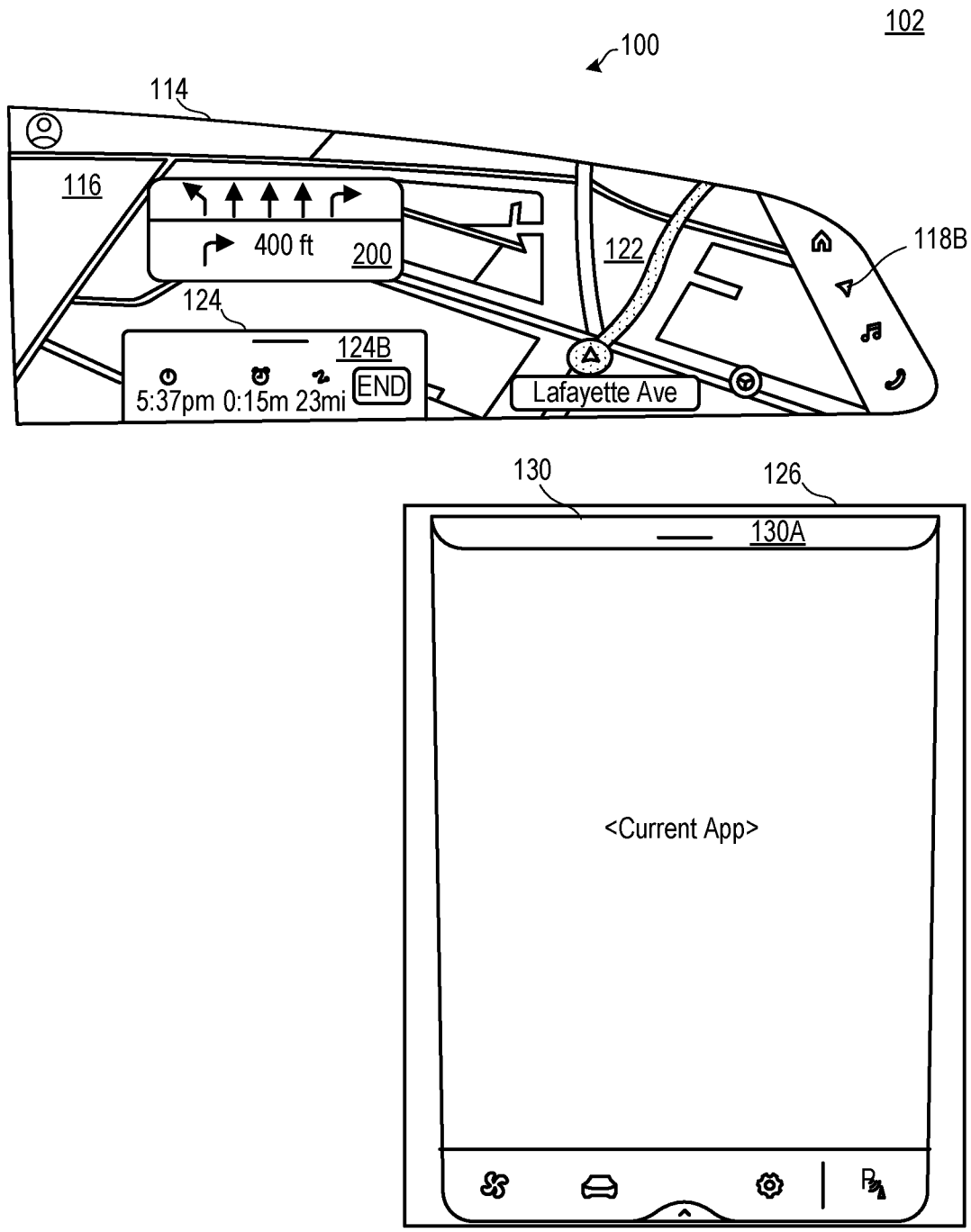
FIGS. 2A-2B show another example of the instrument panel of FIGS. 1A-1B.
Figure 2B:
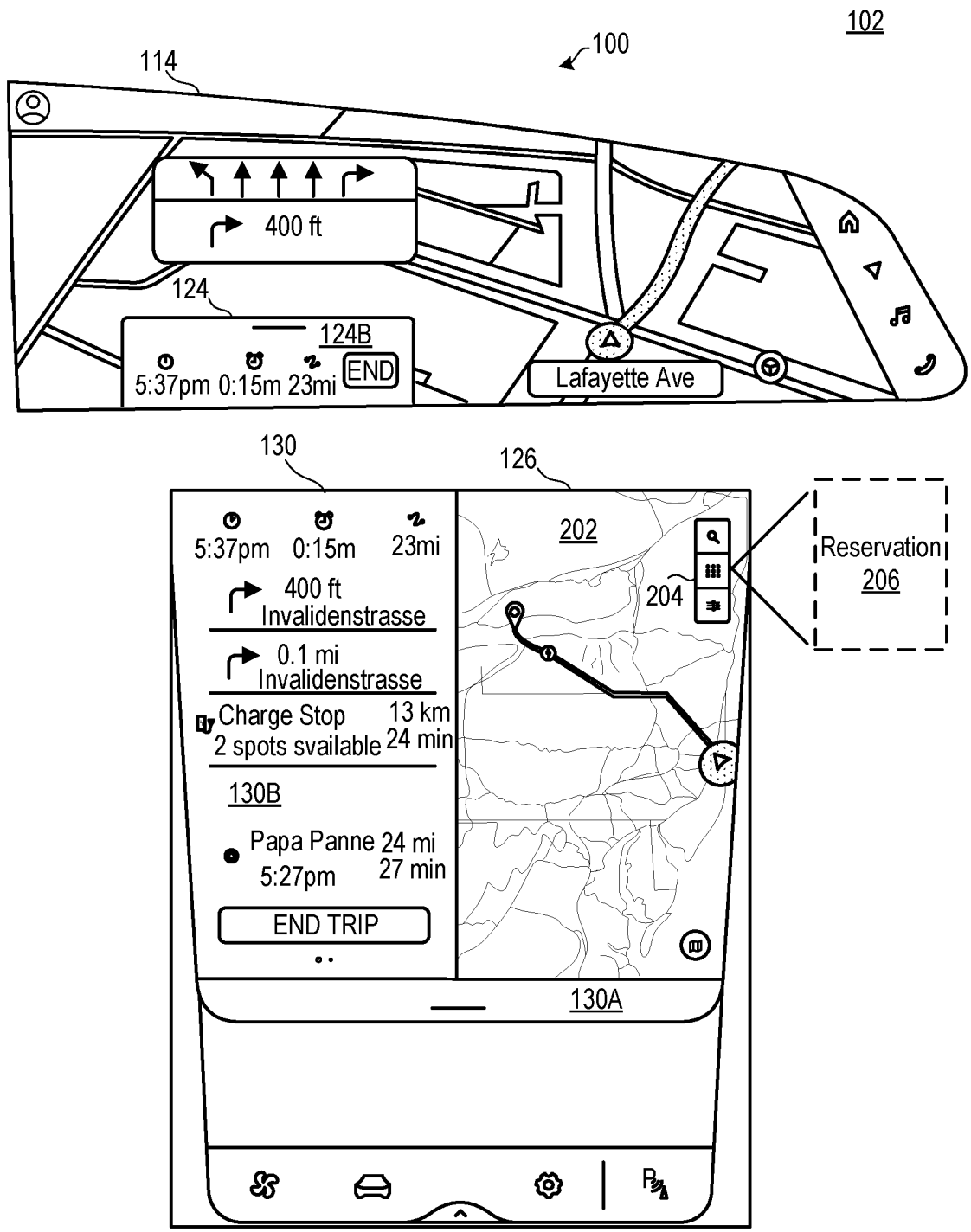

FIGS. 2A-2B show another example of the instrument panel 100 of FIGS. 1A-1B.

Here, only the display devices 114 and 126 are shown for simplicity. In FIG. 2A, the control 118B for the navigation application has been activated, and the navigation application is providing output that is presented as the content 116. The navigation is currently being used for active route guidance. The content 116 includes the map 122 and the drawer area 124, both generated by the navigation application. The drawer area 124 is currently in the extended state. For example, the body 124B of the drawer area 124, and a turn direction 200 of the active route guidance, are currently visible on the display device 114 when the drawer area 124 is in the extended state. The body 124B presently has content including a time of arrival at the navigation destination; a remaining travel time to the destination; a distance to the destination; and an "End" control for terminating the navigation to the destination. When the display device 114 is to be populated with the content 116, a determination can be made as to which of the applications is active, and the content of that application (e.g., here the map 122 and the contents of the drawer area 124) can be provided.

The display device 126 currently provides content corresponding to a core application for the vehicle. The drawer area 130 is currently in the retracted state. For example, only the header 130A, and not the body, of the drawer area 130 is currently visible on the display device 126 when the drawer area 130 is in the retracted state. The header 130A is positioned at a top edge of the display device 126.

An occupant of the vehicle can trigger one or more transitions by generating a transition command. For example, the user can do one or more of tapping on the drawer area 124; performing a swipe gesture on the drawer area 124 (e.g., swiping in a direction toward the display device 126); tapping on the drawer area 130 (e.g., in the header 130A thereof); performing a swipe gesture on the drawer area 130 (e.g., swiping in a direction away from the display device 114); issuing a voice command; or pressing a button/key.

FIG. 2B shows an example of the instrument panel 100 after a transition has been performed. Elements from FIG. 2A that are not mentioned below may remain essentially the same (e.g., remain in a same state) as in the examples above.

The drawer area 124 on the display device 114 is currently in a retracted state. In this example, the retracted state has the same appearance as the extended state for the drawer area 124. In some implementations, the body 124B of the drawer area 124 is presently visible on the display device 114.

The drawer area 130 on the display device 126 is currently in an extended state. In some implementations, the header 130A and the body 130B of the drawer area 130 are both presently visible on the display device 126. The body 130B can include some or all content that was in the drawer area 124 in FIG. 2A. For example, the body 130B presently includes content including a time of arrival at the navigation destination; a remaining travel time to the destination; a distance to the destination; and an "End" control for terminating the navigation to the destination, all of which were presented in the body 124B of the drawer area 124 in FIG. 2A. The body 130B can include additional content that was not visible in the drawer area 124 in FIG. 2A. The body 130B can include a listing of turn-by-turn directions; more information about each turn direction; an overview map 202 showing an entire route of the navigation; and/or a control 204 for access to third party content. In some implementations, the navigation application may currently be focusing on an establishment (e.g., a restaurant) at a destination, and the control 204 can trigger presentation of an area 206 on the display device 126. For example, the area 206 can present a reservation function (e.g., a booking or calendaring interface) relating to the establishment.

One or more additional transitions can be performed. For example, this can be done when the user has finished performing a detailed or complex task using the display device 126, or if the user changes his or her mind about performing the task(s). In some implementations, the user can generate another transition command to trigger a transition back to essentially the state shown in FIG. 2A. For example, the drawer area 130 can then be brought into the retracted state, and the drawer area 124 can be brought into the extended state (which can have the same appearance as the extended state).

Figure 3A:
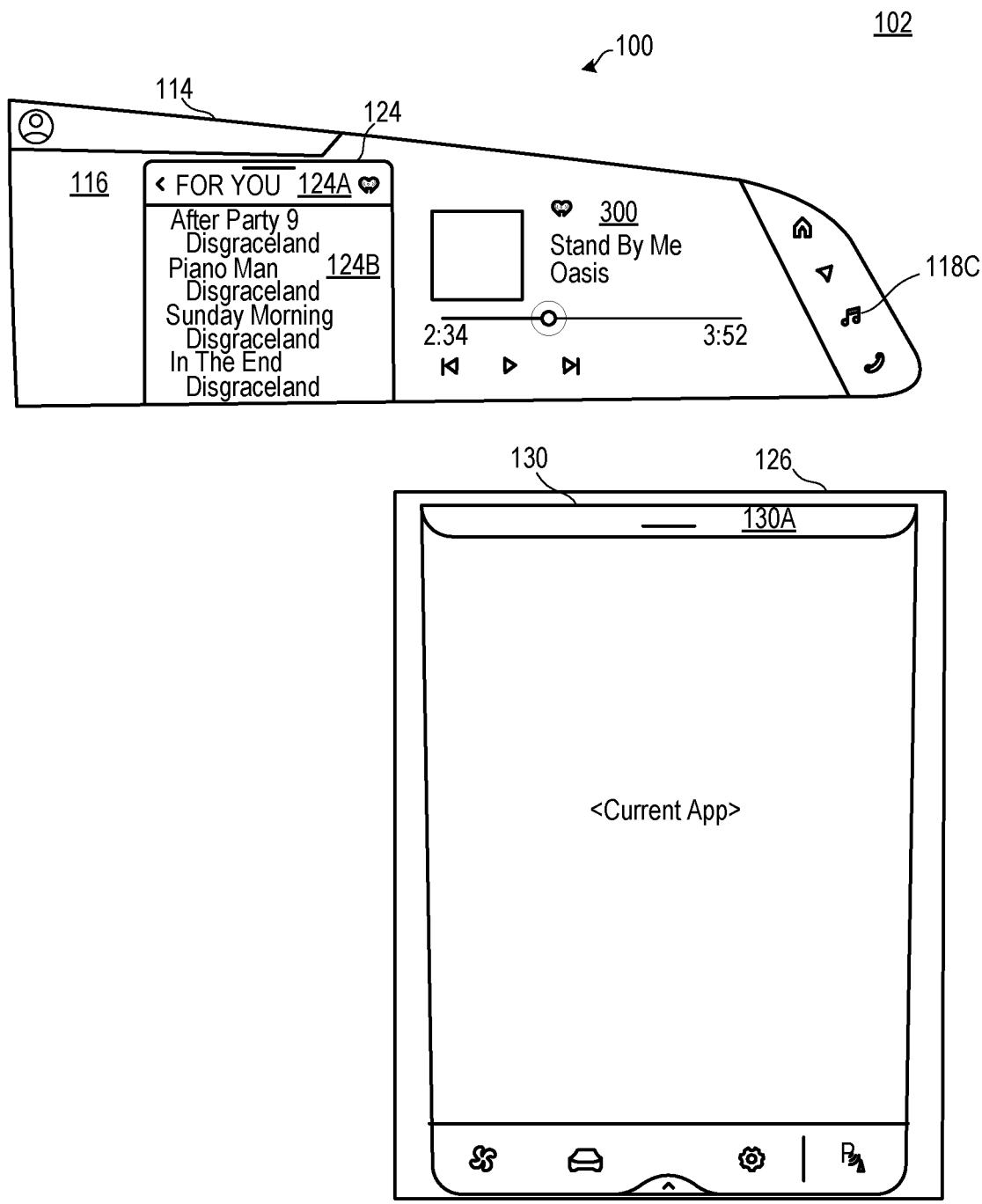
FIGS. 3A-3B show another example of the instrument panel of FIGS. 1A-1B.
Figure 3B:
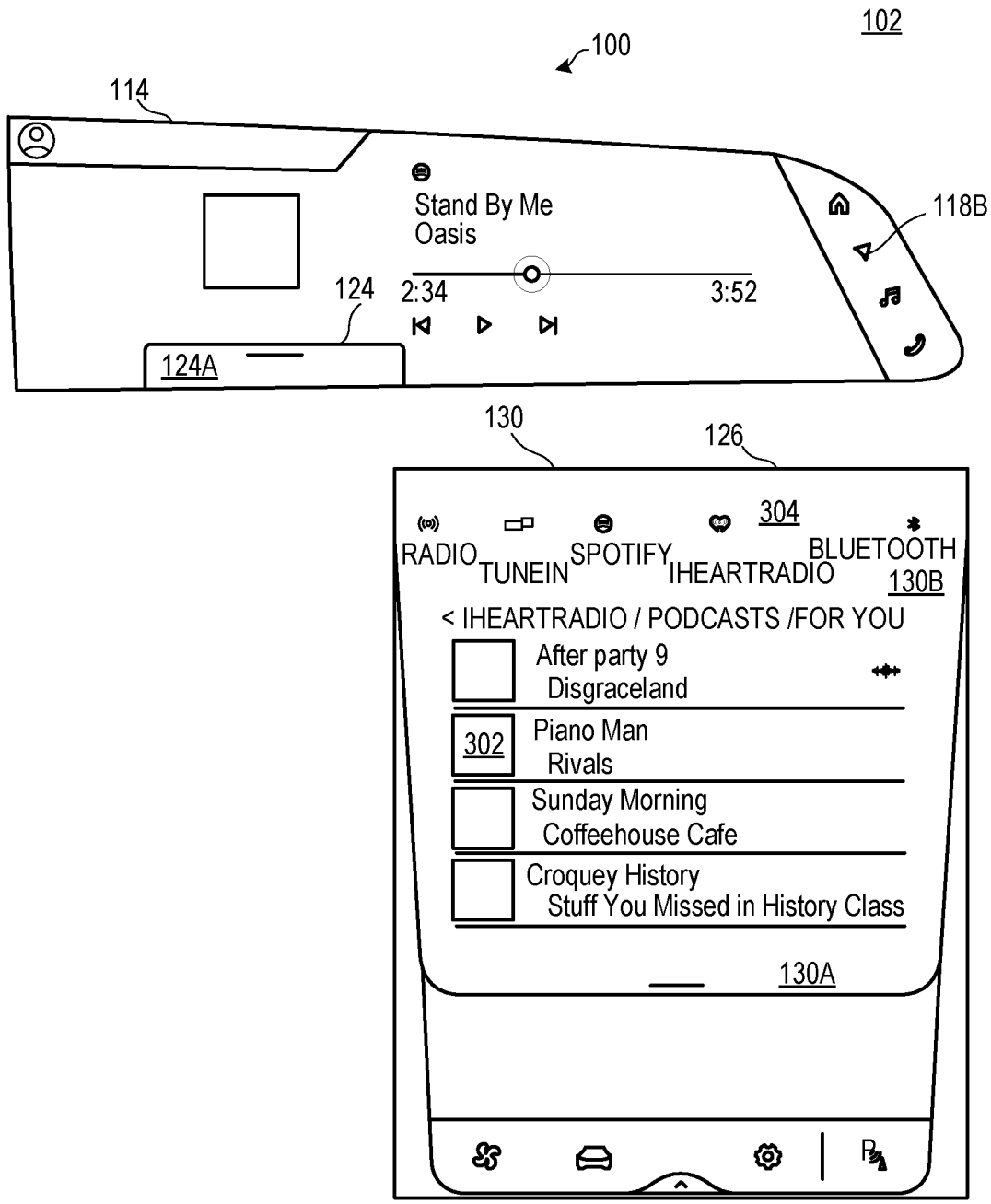

FIGS. 3A-3B show another example of the instrument panel 100 of FIGS. 1A-1B. Here, only the display devices 114 and 126 are shown for simplicity. In FIG. 3A, a control 118C for the media application has been activated, and the media application is providing output that is presented as the content 116. The media application is currently outputting media content in a media player 300. The content 116 includes the media player 300 and the drawer area 124, both generated by the media application. The drawer area 124 is currently in the extended state. For example, the header 124A and the body 124B of the drawer area 124 are currently visible on the display device 114 when the drawer area 124 is in the extended state. The body 124B presently has content including a playlist of media content. When the display device 114 is to be populated with the content 116, a determination can be made as to which of the applications is active, and the content of that application (e.g., here the media player 300 and the contents of the drawer area 124) can be provided.

The display device 126 currently provides content corresponding to a core application for the vehicle. The drawer area 130 is currently in the retracted state. For example, only the header 130A, and not the body, of the drawer area 130 is currently visible on the display device 126 when the drawer area 130 is in the retracted state. The header 130A is positioned at a top edge of the display device 126.

An occupant of the vehicle can trigger one or more transitions by generating a transition command. For example, the user can do one or more of tapping on the drawer area 124; performing a swipe gesture on the drawer area 124 (e.g., swiping in a direction toward the display device 126); tapping on the drawer area 130 (e.g., in the header 130A thereof); performing a swipe gesture on the drawer area 130 (e.g., swiping in a direction away from the display device 114); issuing a voice command; or pressing a button/key.

FIG. 3B shows an example of the instrument panel 100 after a transition has been performed. Elements from FIG. 3A that are not mentioned below may remain essentially the same (e.g., remain in a same state) as in the examples above.

The drawer area 124 on the display device 114 is currently in a retracted state. In some implementations, only the header 124A, and not the body 124B, of the drawer area 124 is presently visible on the display device 114. For example, the header 124A can be positioned at a bottom edge of the display device 114 when the drawer area 124 is in the retracted state.

The drawer area 130 on the display device 126 is currently in an extended state. In some implementations, the header 130A and the body 130B of the drawer area 130 are both presently visible on the display device 126. The body 130B can include some or all content that was in the drawer area 124 in FIG. 3A. For example, the body 130B presently includes the playlist of media content. The body 130B can include additional content that was not visible in the drawer area 124 in FIG. 3A. The body 130B can include media art 302 (e.g., album art) for the tracks on the playlist, and controls 304 for choosing among media providers (e.g., radio or streaming services).

One or more additional transitions can be performed. For example, this can be done when the user has finished performing a detailed or complex task using the display device 126, or if the user changes his or her mind about performing the task(s). In some implementations, the user can generate another transition command to trigger a transition back to essentially the state shown in FIG. 3A. For example, the drawer area 130 can then be brought into the retracted state, and the drawer area 124 can be brought into the extended state.

The user can switch between applications. This can be done by generating a command that deactivates the current application and that activates another application. Here, if the user activates the control 118B the currently active media application would be replaced by the navigation application. The instrument panel 100 could then enter a state similar or identical to that shown in FIG. 1B. The drawer area 130 on the display device 126 can remain extended and can instead be populated with content from the newly activated application (here the navigation application). For example, the drawer area 130 can cease to present the playlist of media content, the media art 302, and the controls 304, and can instead present the contents of the body 130B in FIG. 1B. That is, if the drawer area 130 is in an extended state when the command is generated, the drawer area 130 can remain in the extended state after the other application is activated. Similarly, if the drawer area 124 is in an extended state when the command is generated, the drawer area 124 can remain in the extended state after the other application is activated. Assuming that the transition to the navigation application has occurred, if the user thereafter triggers transition of the drawer area 130 in the state shown in FIG. 1B, then as exemplified above the instrument panel 100 can instead assume a state similar or identical to that shown in FIG. 1A.

Figure 4A:
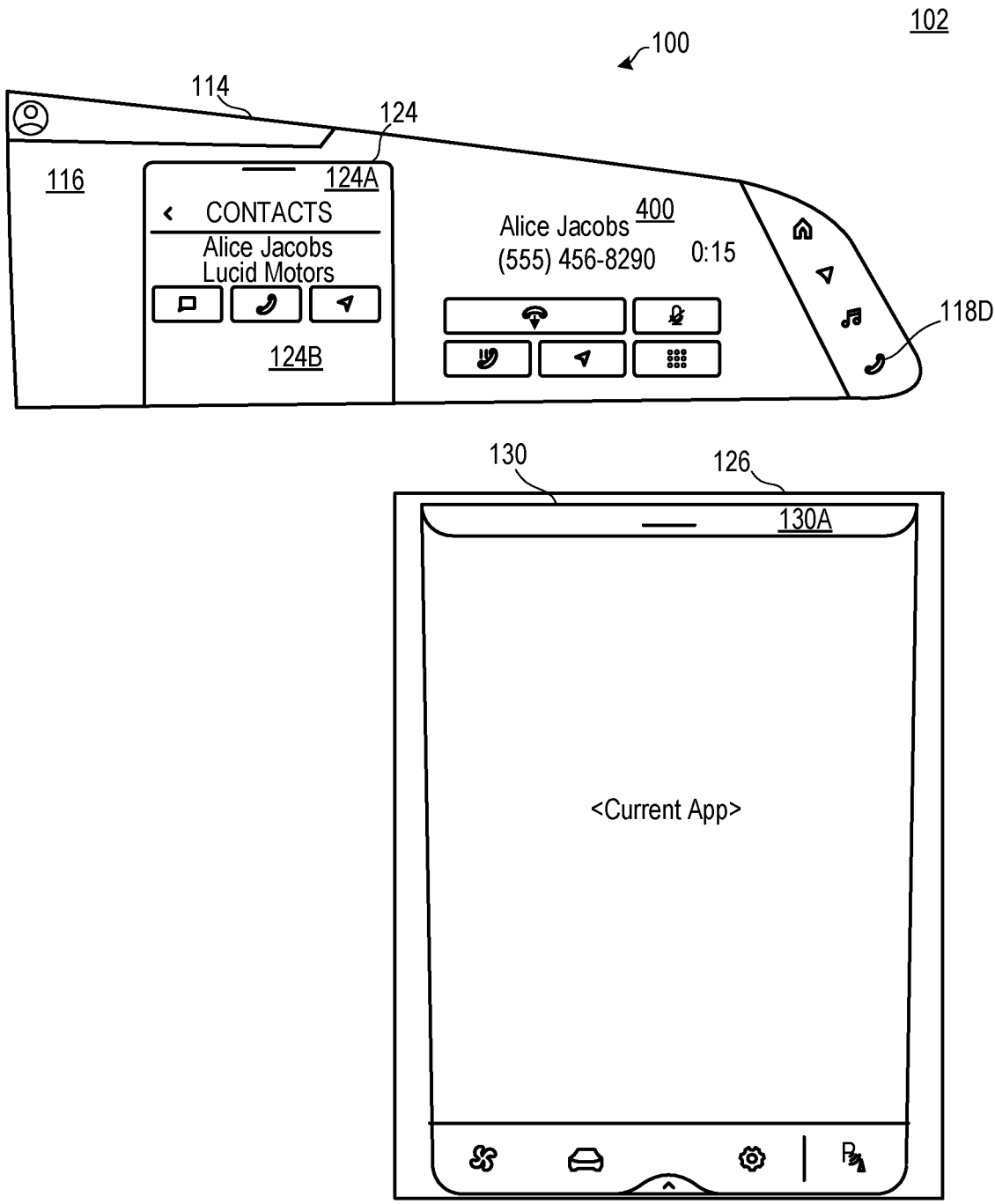
FIGS. 4A-4B show another example of the instrument panel of FIGS. 1A-1B.
Figure 4B:
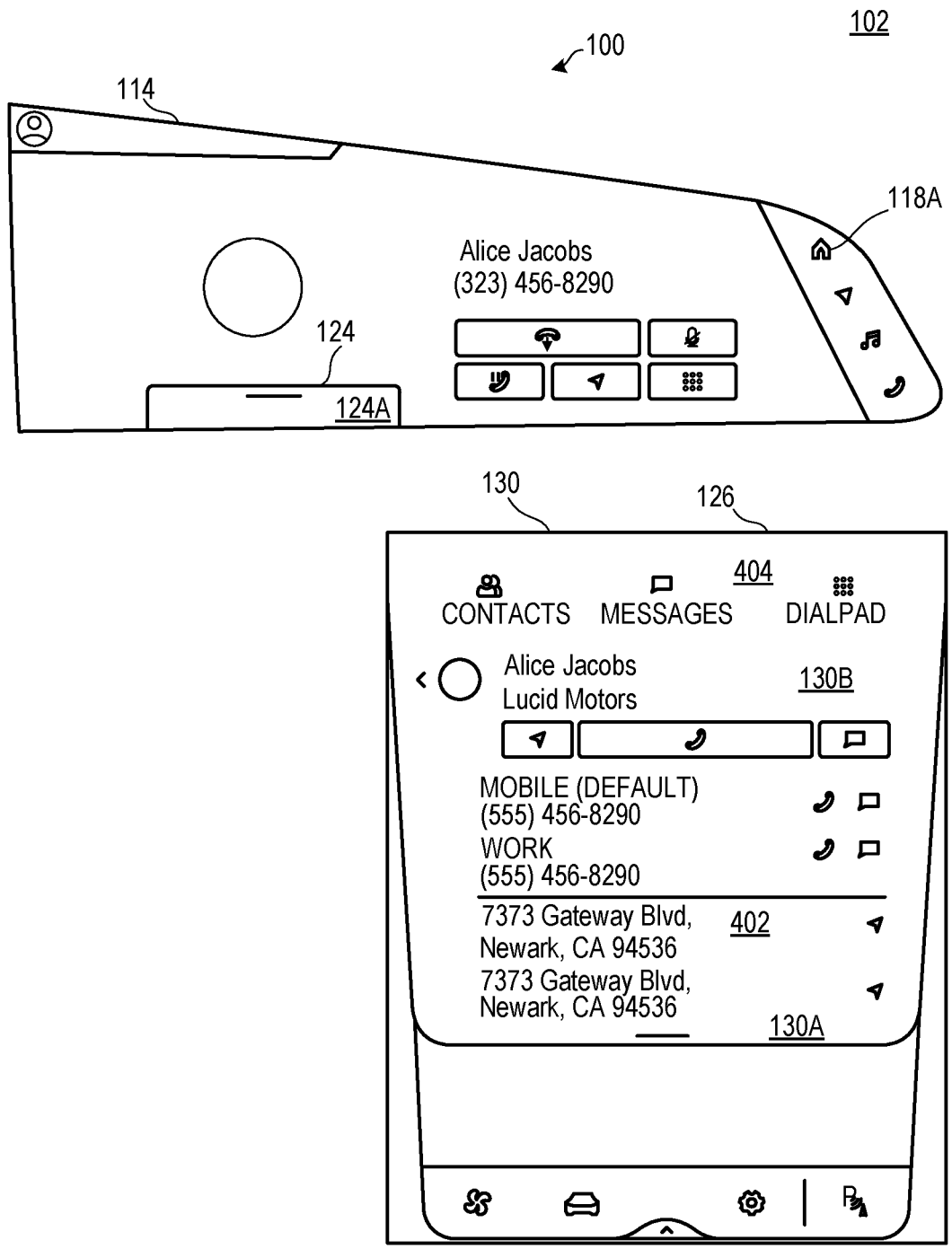

FIGS. 4A-4B show another example of the instrument panel 100 of FIGS. 1A-1B. Here, only the display devices 114 and 126 are shown for simplicity. In FIG. 4A, a control 118D for the phone application has been activated, and the phone application is providing output that is presented as the content 116. The phone application is currently conducting a phone call using a dialer 400. The content 116 includes the dialer 400 and the drawer area 124, both generated by the phone application. The drawer area 124 is currently in the extended state. For example, the header 124A and the body 124B of the drawer area 124 are currently visible on the display device 114 when the drawer area 124 is in the extended state. The body 124B presently has content including contact information for the other party of the current phone call. When the display device 114 is to be populated with the content 116, a determination can be made as to which of the applications is active, and the content of that application (e.g., here the dialer 400 and the contents of the drawer area 124) can be provided.

The display device 126 currently provides content corresponding to a core application for the vehicle. The drawer area 130 is currently in the retracted state. For example, only the header 130A, and not the body, of the drawer area 130 is currently visible on the display device 126 when the drawer area 130 is in the retracted state. The header 130A is positioned at a top edge of the display device 126.

An occupant of the vehicle can trigger one or more transitions by generating a transition command. For example, the user can do one or more of tapping on the drawer area 124; performing a swipe gesture on the drawer area 124 (e.g., swiping in a direction toward the display device 126); tapping on the drawer area 130 (e.g., in the header 130A thereof); performing a swipe gesture on the drawer area 130 (e.g., swiping in a direction away from the display device 114); issuing a voice command; or pressing a button/key.

FIG. 4B shows an example of the instrument panel 100 after a transition has been performed. Elements from FIG. 4A that are not mentioned below may remain essentially the same (e.g., remain in a same state) as in the examples above.

The drawer area 124 on the display device 114 is currently in a retracted state. In some implementations, only the header 124A, and not the body 124B, of the drawer area 124 is presently visible on the display device 114. For example, the header 124A can be positioned at a bottom edge of the display device 114 when the drawer area 124 is in the retracted state.

The drawer area 130 on the display device 126 is currently in an extended state. In some implementations, the header 130A and the body 130B of the drawer area 130 are both presently visible on the display device 126. The body 130B can include some or all content that was in the drawer area 124 in FIG. 4A. For example, the body 130B presently includes the contact information for the other party of the current phone call. The body 130B can include additional content that was not visible in the drawer area 124 in FIG. 4A. The body 130B can include additional information 402 about the contact, and controls 404 for choosing outputs of the phone application. For example, the controls 404 can allow switching between contacts, messages, and a dial pad.

One or more additional transitions can be performed. For example, this can be done when the user has finished performing a detailed or complex task using the display device 126, or if the user changes his or her mind about performing the task(s). In some implementations, the user can generate another transition command to trigger a transition back to essentially the state shown in FIG. 4A. For example, the drawer area 130 can then be brought into the retracted state, and the drawer area 124 can be brought into the extended state.

As another example, if the user activates a control 118A a home screen application can be activated instead of the phone application. In some implementations, the home screen application does not have a drawer associated with it. For example, the drawer area 124 can then be omitted from the display device 114, and the drawer area 130 can be omitted from the display device 126.

Figure 5:
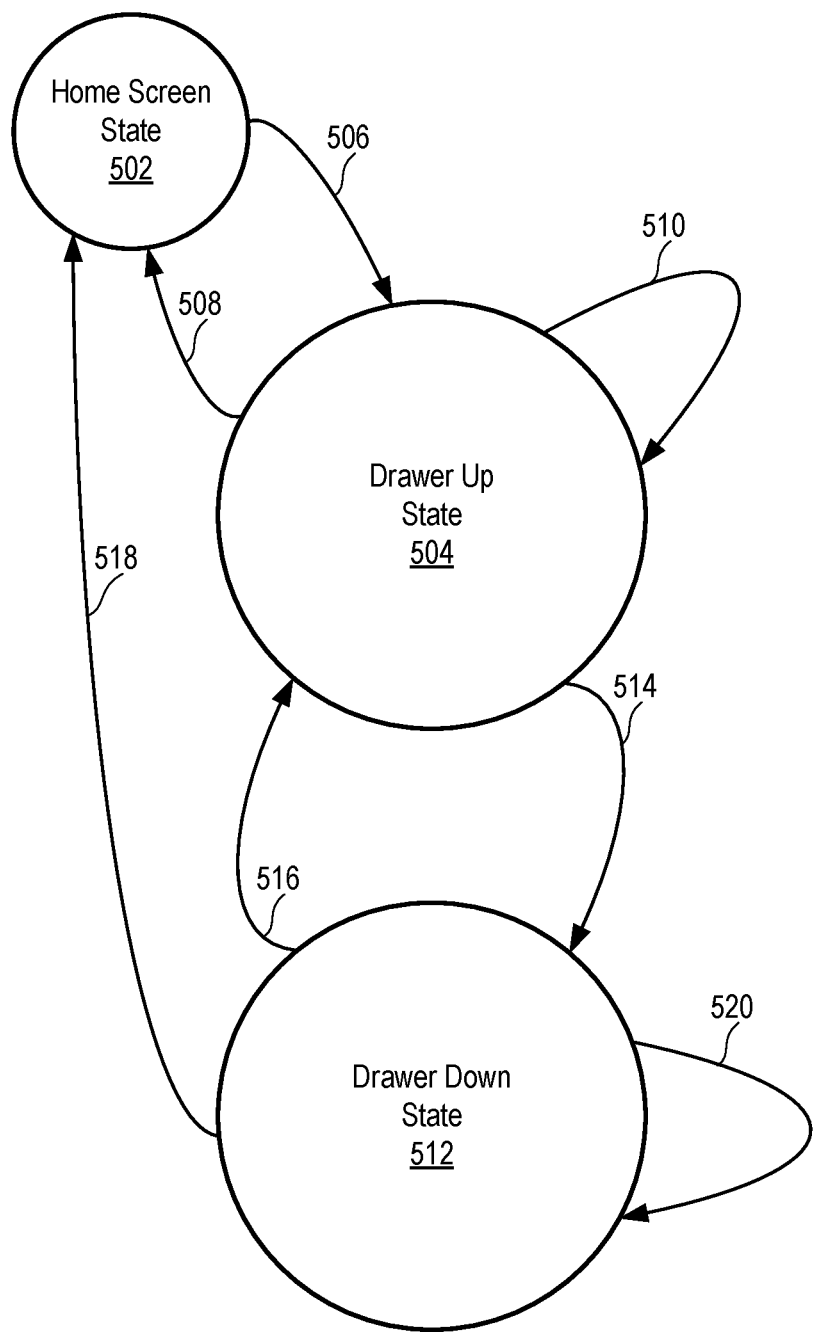
FIG. 5 shows an example of a state diagram for a graphical user interface.

FIG. 5 shows an example of a state diagram 500 for a graphical user interface. The state diagram 500 can be used with one or more other examples described elsewhere herein. For example, one or more display devices described with reference to the instrument panel 100 can operate according to the state diagram 500.

The state diagram 500 includes a home screen state 502. In some implementations, the home screen state 502 can be the default state when the vehicle's infotainment system powers up. As another example, the user can switch to the home screen application by activating the control 118A (FIG. 4B).

The state diagram 500 includes a drawer up state 504. The drawer up state 504 can involve at least one application (e.g., an infotainment application) being active and providing output. The drawer up state 504 can correspond to one or more of the situations illustrated in FIG. 1A, 2A, 3A, or 4A. In some implementations, the graphical user interface can enter the drawer up state 504 by a transition 506 from the home screen state 502. For example, the transition 506 can be triggered by activating any of the controls 118B-118D in the instrument panel 100. In some implementations, the graphical user interface can enter the home screen state 502 by a transition 508 from the drawer up state 504. For example, the transition 508 can be triggered by activating the control 118A in the instrument panel 100.

In the drawer up state 504, a transition 510 can be performed while remaining in the drawer up state 504. In some implementations, the transition 510 involves switching from one application (e.g., an infotainment application) to another application (e.g., another infotainment application), wherein the drawer area 124 on the display device 114 is in the extended state before, during, and after the transition 510. For example, the transition 510 can involve switching from the state shown in one of FIG. 1A, 2A, 3A, or 4A to the state shown in another of FIG. 1A, 2A, 3A, or 4A.

The state diagram 500 includes a drawer down state 512. The drawer down state 512 can involve at least one application (e.g., an infotainment application) being active and providing output. The drawer down state 512 can correspond to one or more of the situations illustrated in FIG. 1B, 2B, 3B, or 4B. In some implementations, the graphical user interface can enter the drawer down state 512 by a transition 514 from the drawer up state 504. For example, the transition 514 can be triggered by a tap, a swipe gesture, a voice command, or a button/key press. In some implementations, the graphical user interface can enter the drawer up state 504 by a transition 516 from the drawer down state 512. For example, the transition 516 can be triggered by a tap, a swipe gesture, a voice command, or a button/key press. In some implementations, the graphical user interface can enter the home screen state 502 by a transition 518 from the drawer down state 512. For example, the transition 518 can be triggered by activating the control 118A in the instrument panel 100.

In the drawer down state 512, a transition 520 can be performed while remaining in the drawer down state 512. In some implementations, the transition 520 involves switching from one application (e.g., an infotainment application) to another application (e.g., another infotainment application), wherein the drawer area 130 on the display device 126 is in the extended state before, during, and after the transition 520. For example, the transition 520 can involve switching from the state shown in one of FIG. 1B, 2B, 3B, or 4B to the state shown in another of FIG. 1B, 2B, 3B, or 4B.

The terms "up" and "down" that occur in the previous examples are used for illustrative purposes only and do not necessarily indicate spatial position, or a relative spatial position, of any drawer area or display device. For example, in the drawer up state 504 a drawer area can be in an extended state on a display device that is not positioned higher than another display device where the corresponding drawer area is in a retracted state. As another example, in the drawer down state 512 a drawer area can be in an extended state on a display device that is not positioned lower than another display device where the corresponding drawer area is in a retracted state.

The above examples illustrate that a graphical user interface (e.g., in the instrument panel 100) can include a first state (e.g., the drawer up state 504) in which a first drawer area (e.g., the drawer area 124) is presented on a first display device in an instrument panel of a vehicle, the first drawer area presented in an extended state (e.g., as shown in any of FIG. 1A, 2A, 3A, or 4A) where first content of a first application is visible in the first drawer area. In the first state, a second drawer area (e.g., the drawer area 130) is presented on a second display device in the instrument panel of the vehicle, the second drawer area presented in a retracted state (e.g., as shown in any of FIG. 1A, 2A, 3A, or 4A) where the first content of the first application is not visible in the second drawer area. The second display device can be positioned lower in the instrument panel than the first display device.

The graphical user interface can include a second state in which the first drawer area is presented in the retracted state (e.g., as shown in any of FIG. 1B, 2B, 3B, or 4B) on the first display device instead of in the extended state, wherein the first content is not visible in the first drawer area in the retracted state. In the second state, the second drawer area is presented in the extended state (e.g., as shown in any of FIG. 1B, 2B, 3B, or 4B) on the second display device, wherein the first content of the first application is visible in the second drawer area, and wherein additional content of the first application that was not visible in the first drawer area is also visible in the second drawer area.

The graphical user interface can include an input control (e.g., a touchscreen, voice recognition function, or a button/keyboard) configured for generating a first transition command, wherein the graphical user interface is configured to switch between the first and second states in response to the first transition command.

Figure 6:
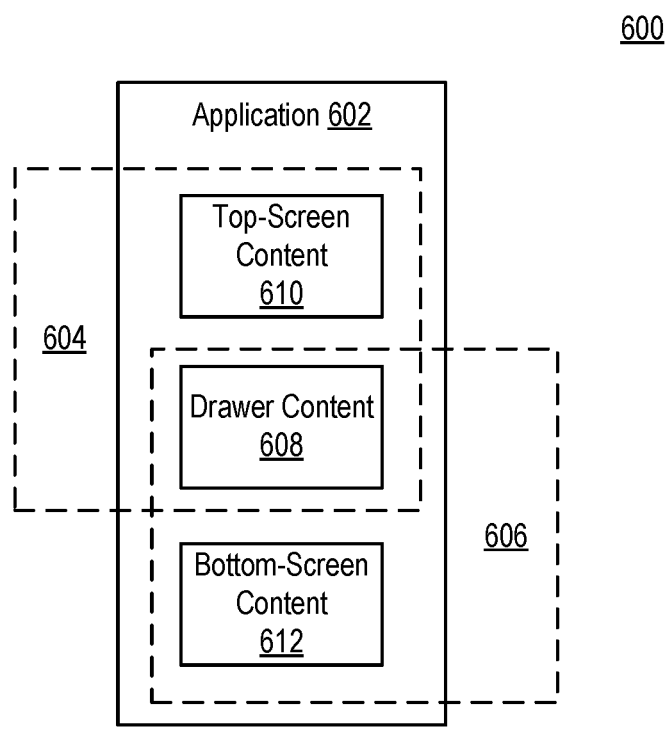
FIG. 6 schematically shows an organization of content from an application.

FIG. 6 schematically shows an organization 600 of content from an application. The organization 600 can be used with one or more other examples described elsewhere herein. In some implementations, the organization 600 can be used with one or more infotainment applications. For example, the organization 600 can be used with one or more of the navigation, media, or phone applications described with regard to the instrument panel 100.

The organization 600 here relates to at least one application 602. The application 602 can include one or more applications described herein, or another application. The application 602 can generate output for a graphical user interface. For example, the output can be presented on one or more display devices. In some implementations, the application 602 can generate output to be presented on a display device 604 and/or on a display device 606. The display devices 604 and 606 are here schematically illustrated as rectangles having dashed outlines.

The application 602 can generate drawer content 608. In some implementations, the drawer content 608 can include high-level application output that a user can consume also while engaged in a relatively demanding activity (e.g., while driving a vehicle). For example, the drawer content 608 can include one or more types of content shown in the body 124B (e.g., in any of FIG. 1A, 2A, 3A, or 4A). As such, the drawer content 608 can be presented on the display device 604, as schematically illustrated in FIG. 6. Some or all of the content shown in the body 124B can also or instead be presented in the body 130B (e.g., as shown in any of FIG. 1B, 2B, 3B, or 4B). As such, the drawer content 608 can be presented on the display device 606, as schematically illustrated in FIG. 6.

The application 602 can generate top-screen content 610. In some implementations, the top-screen content 610 can include high-level application output that a user can consume also while engaged in a relatively demanding activity (e.g., while driving a vehicle), and which may not be directly applicable to any detailed or complex task relating to the same application. For example, the top-screen content 610 can include the content 116 (e.g., in any of FIG. 1A-1B, 2A-2B, 3A-3B, or 4A-4B). As such, the top-screen content 610 can be presented on the display device 604, as schematically illustrated in FIG. 7, and the top-screen content 610 may not appear on the display device 606.

The application 602 can generate bottom-screen content 612. In some implementations, the bottom-screen content 612 can include detailed or otherwise complex application output that a user can consume or interact with when not engaged in a relatively demanding activity (e.g., in a parked vehicle). For example, the bottom-screen content 612 can include one or more types of content shown in the body 130B (e.g., in any of FIG. 1B, 2B, 3B, or 4B). As such, the bottom-screen content 612 can be presented on the display device 606, as schematically illustrated in FIG. 7, and the bottom-screen content 612 may not appear on the display device 604.

The terms "top" and "bottom" that occur in the previous examples are used for illustrative purposes only and do not necessarily indicate spatial position, or a relative spatial position, of any drawer area or display device. For example, the display device 604 may not be positioned higher than the display device 606.

Figure 7:
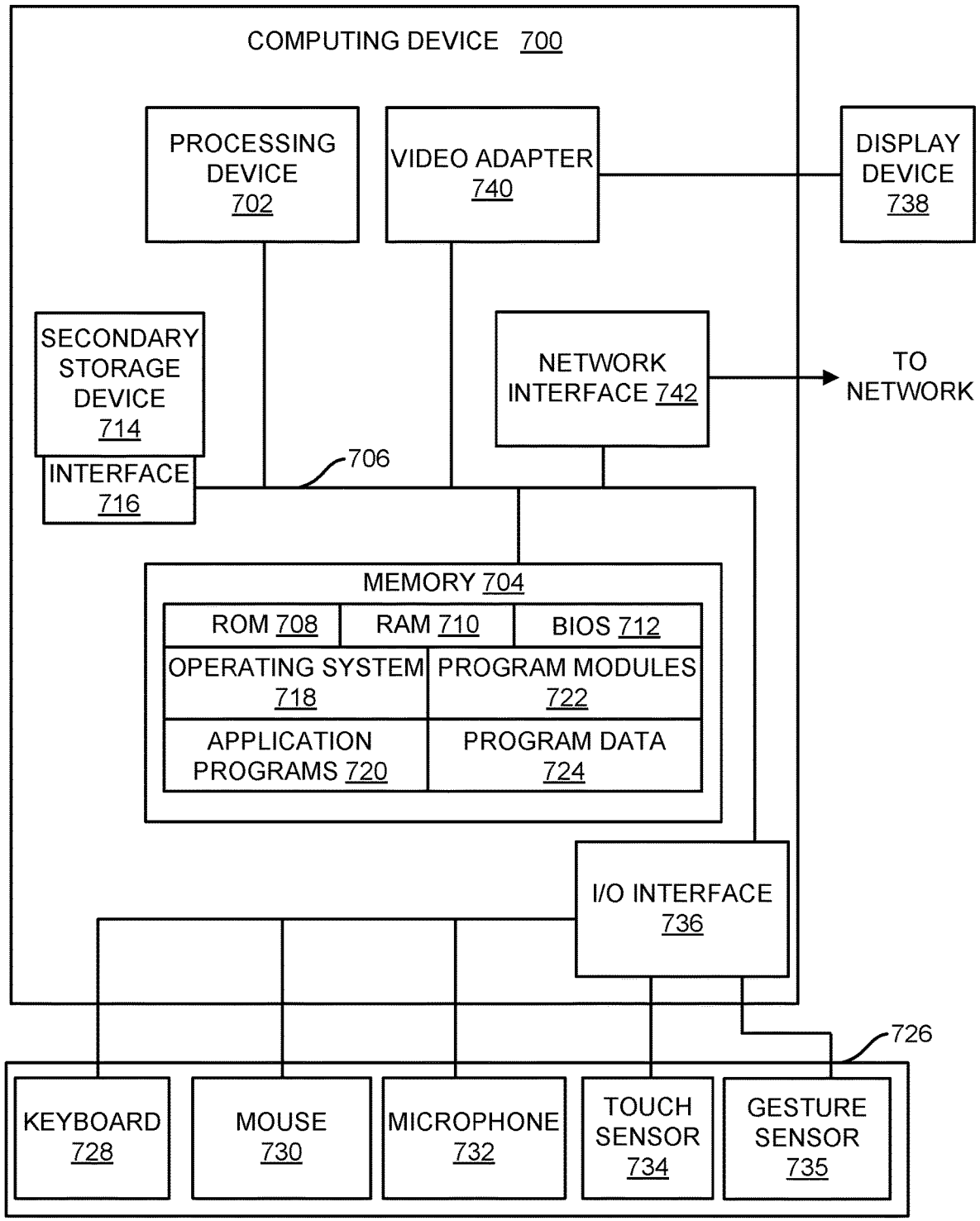
FIG. 7 illustrates an example architecture of a computing device.

FIG. 7 illustrates an example architecture of a computing device 700 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 7 can be used to execute the operating system, application programs, and/or software modules (including the software engines) described herein.

The computing device 700 includes, in some embodiments, at least one processing device 702 (e.g., a processor), such as a central processing unit (CPU). A variety of processing devices are available from a variety of manufacturers, for example, Intel or Advanced Micro Devices. In this example, the computing device 700 also includes a system memory 704, and a system bus 706 that couples various system components including the system memory 704 to the processing device 702. The system bus 706 is one of any number of types of bus structures that can be used, including, but not limited to, a memory bus, or memory controller; a peripheral bus; and a local bus using any of a variety of bus architectures.

Examples of computing devices that can be implemented using the computing device 700 include a desktop computer, a laptop computer, a tablet computer, a mobile computing device (such as a smart phone, a touchpad mobile digital device, or other mobile devices), or other devices configured to process digital instructions.

The system memory 704 includes read only memory 708 and random access memory 710. A basic input/output system 712 containing the basic routines that act to transfer information within computing device 700, such as during start up, can be stored in the read only memory 708.

The computing device 700 also includes a secondary storage device 714 in some embodiments, such as a hard disk drive, for storing digital data. The secondary storage device 714 is connected to the system bus 706 by a secondary storage interface 716. The secondary storage device 714 and its associated computer readable media provide non-volatile and non-transitory storage of computer readable instructions (including application programs and program modules), data structures, and other data for the computing device 700.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 714 and/or system memory 704, including an operating system 718, one or more application programs 720, other program modules 722 (such as the software engines described herein), and program data 724. The computing device 700 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 700 through one or more input devices 726. Examples of input devices 726 include a keyboard 728, mouse 730, microphone 732 (e.g., for voice and/or other audio input), touch sensor 734 (such as a touchpad or touch sensitive display), and gesture sensor 735 (e.g., for gestural input). In some implementations, the input device(s) 726 provide detection based on presence, proximity, and/or motion. In some implementations, a user may walk into their home, and this may trigger an input into a processing device. For example, the input device(s) 726 may then facilitate an automated experience for the user. Other embodiments include other input devices 726. The input devices can be connected to the processing device 702 through an input/output interface 736 that is coupled to the system bus 706. These input devices 726 can be connected by any number of input/output interfaces, such as a parallel port, serial port, game port, or a universal serial bus. Wireless communication between input devices 726 and the input/output interface 736 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 738, such as a monitor, liquid crystal display device, light-emitting diode display device, projector, or touch sensitive display device, is also connected to the system bus 706 via an interface, such as a video adapter 740. In addition to the display device 738, the computing device 700 can include various other peripheral devices (not shown), such as speakers or a printer.

The computing device 700 can be connected to one or more networks through a network interface 742. The network interface 742 can provide for wired and/or wireless communication. In some implementations, the network interface 742 can include one or more antennas for transmitting and/or receiving wireless signals. When used in a local area networking environment or a wide area networking environment (such as the Internet), the network interface 742 can include an Ethernet interface. Other possible embodiments use other communication devices. For example, some embodiments of the computing device 700 include a modem for communicating across the network.

The computing device 700 can include at least some form of computer readable media. Computer readable media includes any available media that can be accessed by the computing device 700. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 700.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An instrument panel of a vehicle, the instrument panel comprising:
  a steering wheel; and
  first and second display devices, the first display device horizontally aligned with an instrument cluster in the vehicle and positioned at least partially behind the steering wheel, the second display device positioned lower in the instrument panel than the first display device and positioned between first-row seats of the vehicle;
  wherein the first display device presents a persistent sidebar with controls for activating a home screen and first and second applications;
  wherein when the first or second application is active on the first display device, first content of the first or second application extends over an entirety of the first display device except for the persistent sidebar;
  wherein each of the first and second applications have a first drawer area with application content, the first drawer area configured for triggering a transition (i) in response to receiving a tap, and (ii) in response to receiving a swipe gesture toward the second display device, wherein in response to the swipe gesture being received, the transition comprises presentation of second content of the first or second application, respectively, by the second display device, and wherein the first drawer area has a same appearance before and after the transition occurs; and
  wherein the first display device provides for switching between the first and second applications using the controls before and after the transition occurs.

2. The instrument panel of claim 1, wherein the first display device is positioned farthest toward a vehicle center among multiple display devices included in the instrument panel, and wherein at least one of the multiple display devices forms the instrument cluster.

3. The instrument panel of claim 2, wherein the multiple display devices include a third display device that forms the instrument cluster and that is positioned behind the steering wheel, and a fourth display device positioned to a side of the third display device.

4. The instrument panel of claim 1, wherein the second content includes at least some of the first content of the first or second application.

5. The instrument panel of claim 4, wherein the second content further comprises additional content of the first or second application.

6. The instrument panel of claim 1, wherein the second content is presented in a second drawer area on the second display device.

7. The instrument panel of claim 6, wherein the second drawer area remains in a same state after the transition as before the transition.

8. The instrument panel of claim 1, wherein each of the first or second application is a navigation application, a media playing application, or a phone application.

* * * * *